United States Patent [19]

McCanney

[11] 3,913,245
[45] Oct. 21, 1975

[54] PROPELLER SOUND SIMULATION

[75] Inventor: Neil R. McCanney, Binghamton, N.Y.

[73] Assignee: The Singer Company, New York, N.Y.

[22] Filed: Apr. 19, 1974

[21] Appl. No.: 462,344

[52] U.S. Cl. .............................. 35/12 Q; 340/384 E
[51] Int. Cl.[2] .......................................... G09B 9/02
[58] Field of Search ............ 35/10.2, 11, 12 F, 12 Q, 35/12 T, 13; 235/184; 272/14; 340/384 R, 384 E

[56] References Cited
UNITED STATES PATENTS

| | | | |
|---|---|---|---|
| 2,494,594 | 1/1950 | Swank | 35/12 Q |
| 2,788,589 | 4/1957 | Stern | 35/12 T |
| 2,898,587 | 8/1959 | Nye | 340/384 E |
| 2,932,094 | 4/1960 | Gallo | 35/12 T |
| 2,951,298 | 9/1960 | Goodwin | 35/12 T |
| 2,974,424 | 3/1961 | Roberts | 35/12 Q |
| 3,623,241 | 11/1971 | Becker et al | 35/13 |
| R25,325 | 1/1963 | Goodwin | 35/12 T |

Primary Examiner—Lawrence Charles
Assistant Examiner—Vance Y. Hum
Attorney, Agent, or Firm—James C. Kesterson

[57] ABSTRACT

Apparatus for modulating the frequency of simulated sounds representative of the several propellers of a multi-engine propeller aircraft. Such modulation produces the characteristic slow undulating droning normally associated with propeller sounds from actual multi-engine aircraft as the aircraft engine servo system attempts to synchronize the speed of the several propellers. The continued varying frequency of the output sound occurs by randomly degrading the response of the electronic servo system which is used to control the simulated engine speed. This random degradation prevents a precise and rapid synchronization lock which if allowed to occur would prevent modulation of the output sound and consequently eliminate the characteristic droning.

8 Claims, 13 Drawing Figures

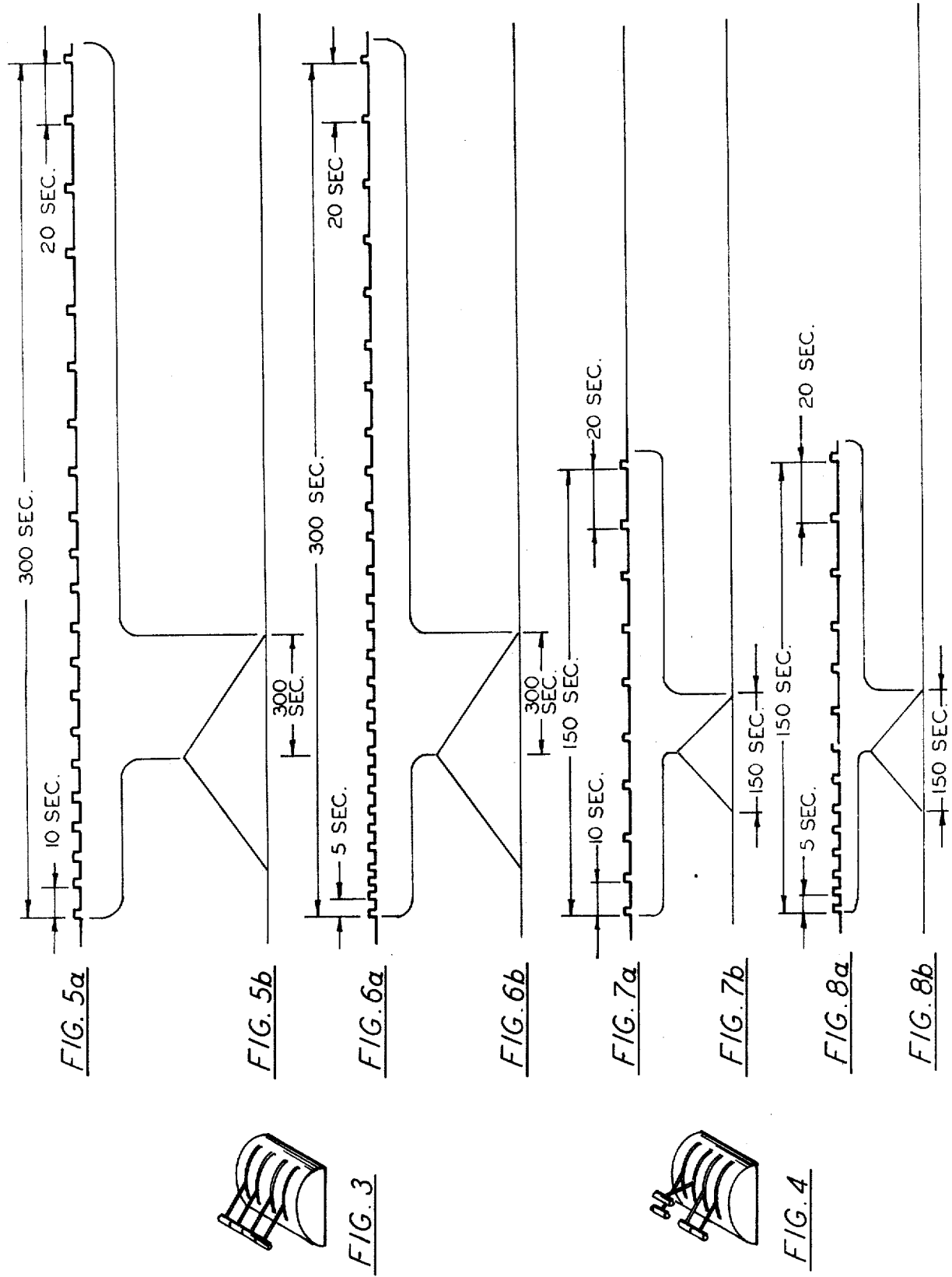

PROPELLER SOUND SIMULATION

The invention herein described was made in the course of or under contract, or subcontract thereunder, with the Department of the Navy.

BACKGROUND OF THE INVENTION

1. Field of the Invention

This invention relates to the simulation of sounds in an aircraft trainer and more specifically, to the synthesizing of sounds associated with the synchronizing and lack thereof of the speed of the several propellers of a multi-engine aircraft.

2. Description of the Prior Art

In the past, sound simulation has often been incorporated as an add-on or afterthought in the overall simulating of an aircraft trainer. Particular sounds which were considered important such as, for example, engine noise, propeller noise, turbine noise, landing gear locking into place and wheel screech, were sometimes simulated and then transmitted to the simulator pilot through a single loudspeaker located in the simulator cockpit. Such systems did provide some indication of the appropriate sounds but were in general rather crude and not too realistic. Other efforts at aircraft sound simulation included the positioning of one or more separate speakers around the outside of the aircraft at the approximate location that the sound would emanate from if produced by a real aircraft. For example, sound simulation for an engine located on a wing would be provided by a loudspeaker located externally to the side of the aircraft simulator which produced only the sound of that engine.

However, over the years, a demand for more and more realism in aircraft trainers has developed, and in addition to providing realistic cockpit mockups with controls and instruments, more realistic simulation of other sensory cues is also being required. An example of an advanced sound system is disclosed in U.S. Pat. No. 3,483,634 granted to L. A. Staples et al on Dec. 16, 1969. Another, and particularly suitable sound system for use with vehicle trainers which provides very realistic sounds from the proper direction, is described in U.S. Pat. No. 3,845,572 which issued on Nov. 5, 1974 from application Ser. No. 277,395 filed by Neil R. McCanney on Aug. 2, 1972, and which was co-pending with the present application. However, notwithstanding the versatility of the aforementioned application and patent, there are certain types of sound simulation problems which require even more specific methods and apparatus. More specifically, there are certain sound problems that have been found to exist because the simulating techniques used were "too good." For example, it is common to use an all electronic system to simulate certain systems which in the real aircraft are mechanical or hydraulic. Such electronic simulation is often much more sensitive and responsive to control and correction signals than are the actual aircraft systems. Therefore, the pilot "flying" the simulator finds the performance of the simulator much more responsive than ever can be realized with a real aircraft. Since such superior performance is not a realistic simulation of an actual aircraft, it is usually undesirable. More particularly, in multi-engine, propeller-driven aircraft, considerable effort is made to maintain all propellers of an aircraft at the same speed. Such synchronization is highly desirable to avoid extreme vibrations in the aircraft which could be so great as to threaten the structural integrity of the aircraft. In such actual aircraft, synchronization cannot usually be maintained by simply carefully setting the propeller speed and leaving it at that. The reason that a single setting of the throttle is not adequate is because the speed of the engine, and eventually the propeller speed itself, is determined by many factors including but not limited to fuel flow, engine performance, propeller balance, air turbulence and other aerodynamic parameters which affect the propeller loading. Thus, a change in any one of these parameters can affect the propeller speed and since there are so many parameters that can and do change, it can be seen that maintaining synchronization of such multi-propellered aircraft is a continuing task. In many and perhaps most multi-engine propellered aircraft, a hydraulic/mechanical servo system is used to automatically maintain synchronization of the propeller speeds within limits. Such hydraulic/mechanical systems have been found to be satisfactory for use with an aircraft, but compared to an all electronic simulation of the servo system, the actual system is very, very slow. Therefore, in simulating sound representative of the individual propellers while at the same time providing an electronic servo system to synchronize the speed of the simulated propellers, the "too good" effect has been experienced. That is, the electronic servo system controlling the speed of the several propellers is so fast and so stable that the continuous "drifting" and "seeking" of the actual aircraft system which produces the characteristic droning of a multi-engine aircraft does not occur and thereby degrades the overall simulation of the aircraft trainer.

A typical propeller synchronizing system used on multi-engine aircraft is the Hamilton Standard 54H60 Hydromatic Propeller System.

Therefore, it is an object of the present invention to provide a system for producing simulated sounds which are characteristic of the sound produced by multi-engine propeller-driven aircraft as the speeds of the several aircraft propellers are continuously synchronized to operate at the same speed.

SUMMARY OF THE INVENTION

To accomplish the above-mentioned object and other objects which will become evident from the following drawings and detailed description, the present invention provides circuitry, for use with an acoustic system for simulating the sounds characteristic of a multi-engine aircraft, for modulating the acoustic output to produce the undulating droning sounds generated by the aircraft propellers as their speed is regulated to the speed of a selected one of the propellers. This circuitry, in brief, includes a group of signal generators equal to the number of engines included in the simulator which produces an output signal, such as a pulse train output, having a characteristic representative of the simulated engine speed. These signal generators are responsive to an input control signal which is a combination of the throttle setting input and a signal for controlling synchronization. Since there is more than one engine, selection means is also provided for selecting one of the signal generator outputs as the output reference signal. This output reference signal is then combined with an error signal to produce a slowly changing synchronization signal which eventually controls the pulse train output of the signal generator. The output of the signal generator is also used to modulate the sound of a multi-propeller sound generator to produce the characteristic droning of a multi-engine aircraft.

BRIEF DESCRIPTION OF THE DRAWING

FIG. 3 is illustrative of the throttles of a four engine plane in alignment;

FIG. 4 is illustrative of the throttles of a four engine plane not in alignment;

FIGS. 5a and 5b through 8a and 8b illustrate the change in pulse rate output of a pulse generator as a result of varying the rate and amplitude of a triangular input control signal; and FIG. 9 illustrates a circuit for converting a pulse train into a DC voltage level for controlling the frequency of a sound generator.

DETAILED DESCRIPTION OF THE INVENTION

Figure 1:
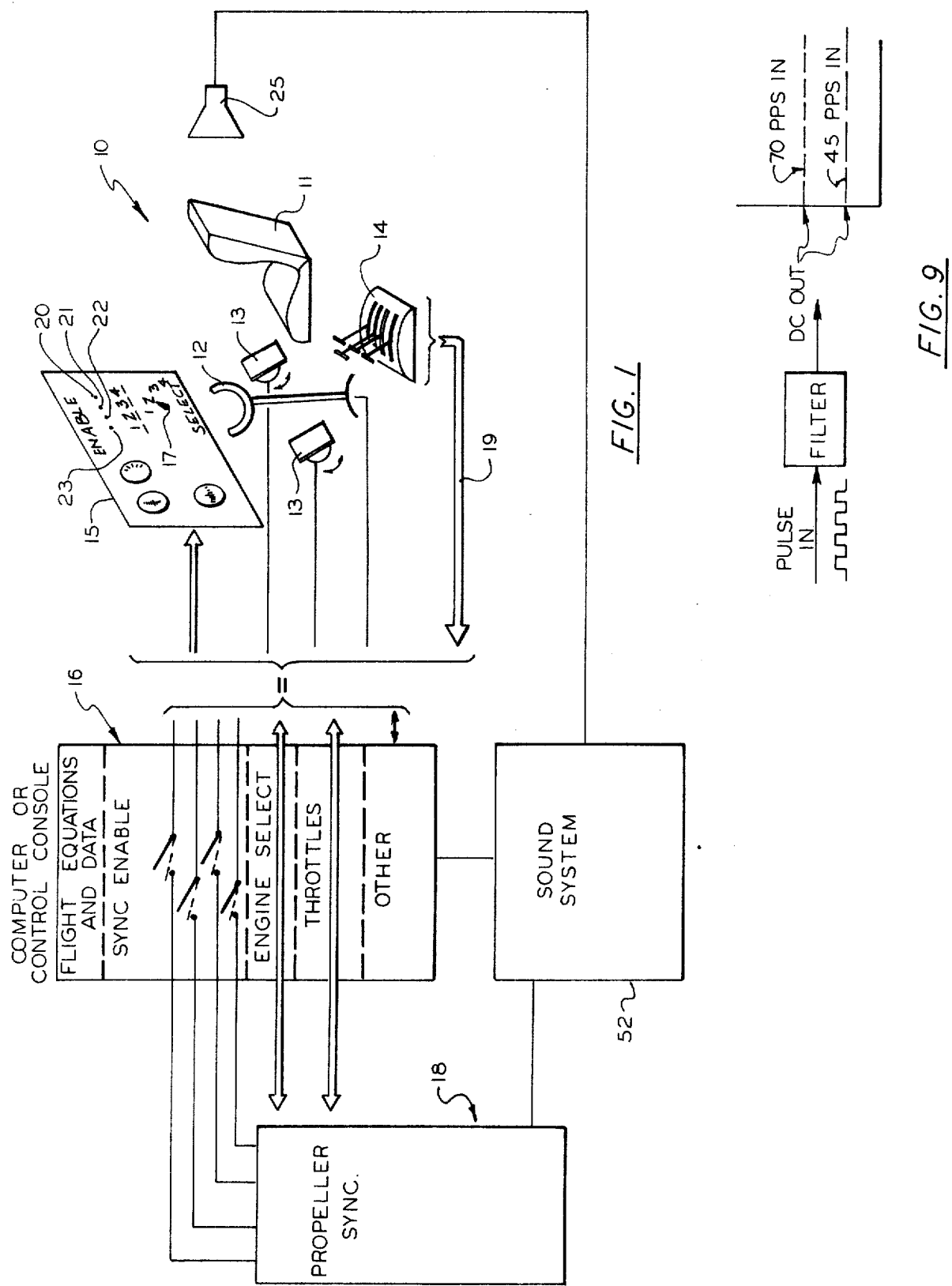
FIG. 1 illustrates a block diagram of a flight simulator which includes the propeller synchronization sound system of the present invention.

Referring now to FIG. 1, there is shown a typical aircraft simulator which incorporates the propeller synchronization sound system of the present invention. Cockpit 10 typically includes a pilot seat 11, a control stick 12 for aileron and elevator control, pedals 13 for rudder control, throttles 14 and instrument panel 15. In a typical flight simulator, the output signals from these controls are applied to a flight computer, for example a PDP 11/45 computer, or other control apparatus 16. In a complex simulator, flight computer 16 has stored therein all of the necessary flight equations and coefficients applicable to the aircraft being simulated such that as output signals representative of the position of the different simulator cockpit controls are received at flight computer 16, the computer, in accordance with the appropriate flight equations and data continuously determines the simulated flight conditions of the simulated aircraft such as attitude, speed, direction, etc. Signals representative of these flight conditions are then applied to indicators in the simulator cockpit to represent and simulate those conditions that the aircraft being simulated would actually experience if such control movements were being carried out with an actual aircraft in flight. Thus, the instruments and indicators located on the instrument panel 15 of the simulator cockpit give the student pilot a realistic indication of his simulated altitude, air speed, direction, etc. Now, in accordance with the present invention, there is shown an engine select switch 17 which is in appearance identical to the actual engine select switch found in a real aircraft. This engine select switch 17 is used for selecting which of the engines of the multi-engine simulator is to be used as the primary or master engine. That is, the engine controlling the propeller to which all the other propellers are to be synchronized. Although in the present embodiment, the engine selection is shown as being accomplished by use of a single rotary selection switch, it will be appreciated that any selection switch technique could be employed. Another suitable technique would be mutually exclusive toggle switches. The signal from switch 17 which indicates the engine selected as master may be routed through flight computer 16, or could be applied directly to synchronizer circuitry 18. In FIG. 1, the signal is shown going through the flight computer since in complex simulators, all input and output signals from the trainer cockpit are normally routed through the flight computer for purposes of at least monitoring, making permanent records, etc. Also as shown in FIG. 1, signals from the four throttles in the simulator cockpit are routed through flight computer 16 on connecting lines 19 before being routed to synchronizing circuitry 18. Although for purposes of the present invention, the throttle input signals could be routed directly to the synchronizing circuitry, they typically pass through the flight computer at least for processing signal conditioning and other such purposes. This is particularly true with respect to a complex simulator since the throttle signal is also one of the primary inputs that must be used by the flight equations in determining the simulated aircraft performance. There is also shown in cockpit 10 of FIG. 1 four enable switches 20, 21, 22 and 23 for enabling the synchronizing circuitry of each engine by providing signals through flight computer 16 to synchronizing circuitry 18. These switches are normally not placed in the enable position by the simulator pilot until the simulated engines to be synchronized have already achieved a reasonably close speed with respect to each other. For example, in a real flight situation, the pilot would not enable synchronizing circuitry until the propeller speeds were coordinated by movement of the throttles to a predetermined point with respect to each other, such as within about 2 percent. In addition to switches 20, 21, 22 and 23 in cockpit 10, other switches in series with switches 20, 21, 22 and 23, respectively, may also be available at the instructor's console (or automatically controlled by the flight computer) to insure that the propeller speeds are within predetermined speeds before the circuitry is enabled. Otherwise, the student pilot might try to synchronize an operating simulator engine with a simulator engine that is shut down. If a flight computer is used, the computer verifies the speeds are in tolerance; otherwise, the instructor verifies the speeds.

Thus, if a typical electronic synchronizing system was used in the flight simulator, the circuitry would act upon the necessary signals and synchronize the simulated engine speeds quickly and precisely to obtain a desired result. However, in actual aircraft, such precise and quick synchronization is not normal and, therefore, such synchronization does not realistically simulate a multi-engine aircraft. Therefore, once the synchronizing circuitry is enabled and is operating in a synchronizing mode, perturbations are uniquely inserted according to the present invention into the synchronization circuitry to modulate the simulated propeller speed output. This output, representative of the propeller speed, is then applied on line 24 to the sound system of the flight simulator system for modulating the sound of the various engines such that the typical droning and seeking heard in a multi-engine aircraft is presented at loudspeaker 25 in the cockpit.

Figure 2:
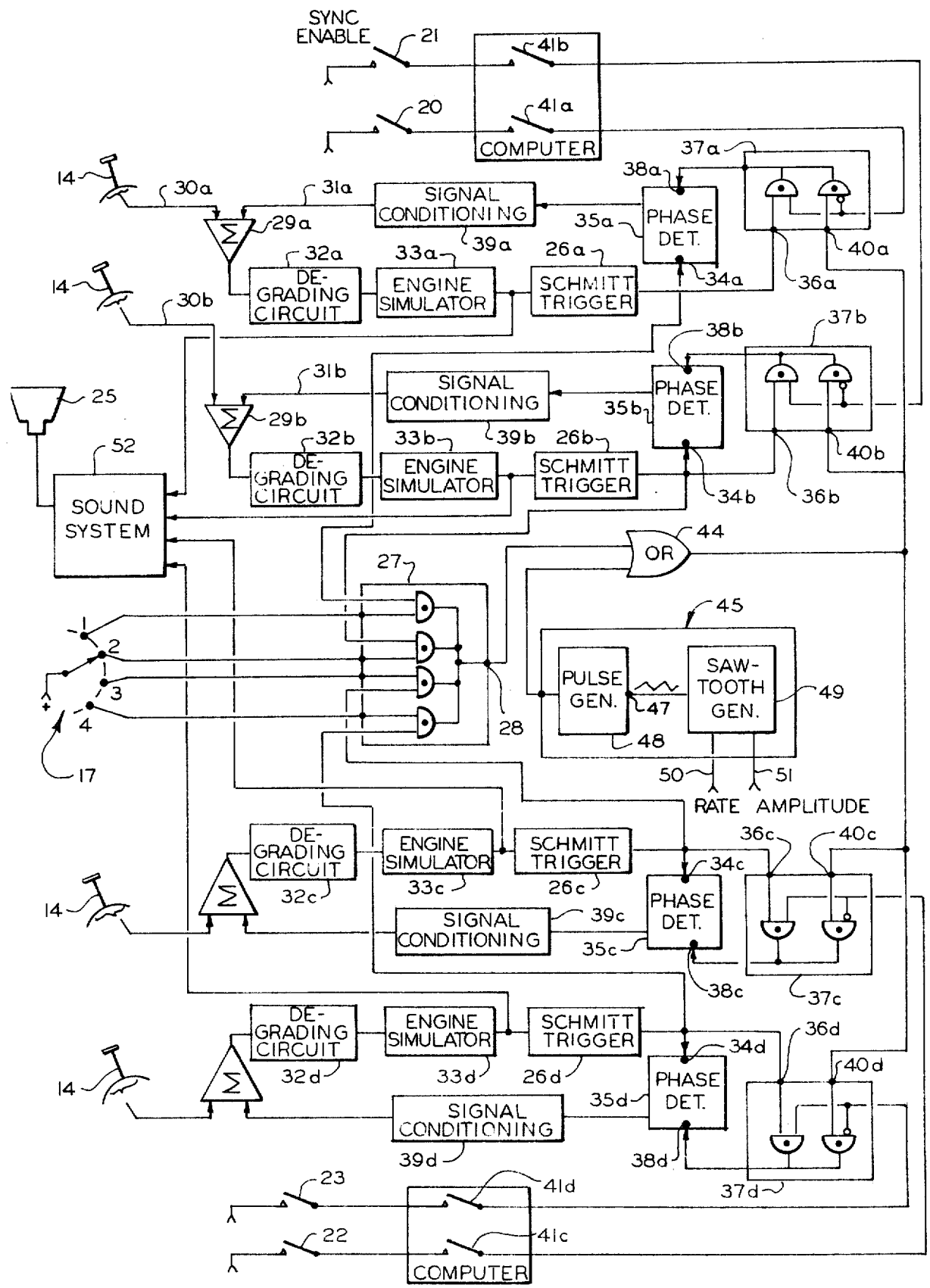
FIG. 2 is a part schematic, part block diagram of one embodiment of the sound system of the present invention.

Referring now to FIG. 2, there is shown an embodiment of the present invention for use in simulating a four engine propeller aircraft. It should be appreciated at this point that the invention is also applicable to any number of multi-engines of two or more by adding circuitry similar to that shown. For example, as can readily be seen, for simulating a four engine aircraft as is being described in this embodiment, there are four exactly identical circuits for each of the four engines. There would be N such circuits if the aircraft to be simulated was an N-engine aircraft. Therefore, those components which are identical in all four engines will use the same basic reference number but include the subscripts $a$, $b$, $c$ and $d$ to represent engines 1, 2, 3 and 4, respectively. Now, assuming a simulated mission is in progress, the pilot trainee will, of course, advance or retard his throttles as necessary to control the simulated aircraft. Thus, as would be expected, the setting of the four throttles in this particular embodiment will have a direct effect upon the speed of the respective propellers. At some point in the simulated flight mission, the pilot trainee will choose to synchronize the speed of the propellers to eliminate undesired vibrations due to the propellers being out of synchronization. Therefore, the pilot trainee will select one of the engines to be the master engine. That is, the engine which drives the propeller to which all the other propellers are to be synchronized. In actual flight situations, the selected engine is typically the most stable inboard engine on the aircraft. However, it will be appreciated that the actual engine selected could be any one of the possible four engines. Therefore, in the present embodiment, engine 2 will be selected. Thus, selector switch 17 as shown in FIG. 2 will be positioned such that an output from Schmitt trigger 26$b$ which represents the propeller speed associated with engine 2 will be passed through selection gate 27 to output terminal 28. According to FIG. 2, selector switch 17 is illustrated as a rotary selector switch and selection gate 27 as four "AND" gates; however, it will be appreciated that selector switch 17 and selection gate 27 could be any suitable circuitry. In actual operation, as was mentioned heretofore, it will be appreciated that the pilot typically will not try to synchronize his engines until he has indications from his instruments that the propeller speeds are substantially close to synchronization or, typically, within about 2 percent of synchronization. Therefore, as was also mentioned briefly heretofore, synchronization is prevented until the propeller speeds arrive at this predetermined outside limit.

Since the synchronization system for each engine operates the same, only the synchronization of engine 1 will be discussed hereinafter. A signal representative of the throttle control position will be applied to summing amplifier 29$a$ on line 30$a$. This signal is summed and combined algebraically with a phase error signal on line 31$a$, which signal is to be discussed later. The combination signal out of summing amplifier 29$a$ according to the present embodiment is then applied to a degrading circuit 32$a$ which alters the output signal by a selected amount such as, for example, 1 or 2 percent, so that the output of degrading circuit 32$a$ has some value other than that provided from summing amplifier 29$a$. This circuitry might typically be nothing more than an attenuating resistor network. Degrading circuit 32$a$ is not necessary for every embodiment of the present invention but helps to achieve realism in the synchronizing circuit. For example, the potentiometer attached to the throttles of the simulator throttle system will provide such a stable and precise output compared to the hydraulic/mechanical linkage system used in an actual aircraft that the simulator pilot might well achieve substantial synchronization by simply lining up the throttles in a straight row such as shown in FIG. 3. In actual aircraft, however, once the pilot has achieved the closest propeller speed synchronization possible by manual means, the throttles typically take on a staggered appearance such as shown in FIG. 4. Therefore, in the present embodiment it will be appreciated that the signals applied to simulator engine circuitry 33$a$, 33$b$, 33$c$ and 33$d$ are attenuated or otherwise changed so that substantial sychronization cannot be achieved by aligning the four throttles in simulator cockpit 10. The circuitry 33$a$, 33$b$, 33$c$ and 33$d$ for sumulating the four engines in the present embodiment are voltage-controlled function generators which supply triangular output pulses at a rate determined by the amplitude of the input voltage and representative of the propeller speed. Suitable circuitry for this purpose includes but is certainly not limited to voltage-controlled function generator Part No. 370–212, manufactured by Wavetek Co., San Diego, California. The triangular pulse outputs from engine simulator circuits 33$a$, 33$b$, 33$c$ and 33$d$ are then applied to the sound system itself for modulating the engine sound system. The manner in which this signal is used to modulate the sound system will be discussed hereinafter. The output pulse signals representing the prop rate may, if desired, then be applied to signal conditioning circuitry. In the present embodiment, the signal conditioning circuitry comprises Schmitt trigger 26$a$ which produces square wave pulses at the same rate as the triangular pulses. The signals from Schmitt trigger 26$a$, which are now square waves, are applied to input 34$a$ of phase detector 35$a$ and to input 36$a$ of gate 37$a$. Phase detector 35$a$ compares the pulse train output of gate 37$a$ applied at input 38$a$ with the pulse train from Schmitt trigger 26$a$ to determine the phase relationship between the two pulse trains. A suitable phase detector for this purpose is a digital phase detector, manufactured by Motorola Semiconductor Products, Inc., Phoenix, Arizona, Part No. MC 4044. Phase detector 35$a$ then provides an analog output representative of the difference in phases or phase error between the two inputs to signal conditioning circuits 39$a$, 39$b$, 39$c$ and 39$d$, to be discussed hereinafter. Although phase detector 35$a$ has been described as digital phase detector circuitry for determining the phase relationship between two pulse trains, it will be appreciated that analog phase detectors could be used although sensitivity problems are anticipated with the use of analog phase detection.

Thus, for engine 1, it can now be seen that phase detector 35$a$ compares the pulse signals from engine 1 applied at input 34$a$ to the pulse signals received at input 38$a$ from gate 37$a$. Prior to receiving a synchronization enable signal, the input received from gate 37$a$ and applied to phase detector 35$a$ is the same pulse signal or train from engine 1. That is, the pulse signal is compared to itself such that there is no difference in the phasing of the two signals, and the output or phase error signal of phase detector 35$a$ will be zero. However, once the synchronization/enable signal has been applied to gate 37$a$, the phase detector 35$a$ compares the pulse train from Schmitt trigger 26$a$ applied at 34$a$ to the input received at terminal 40$a$ of gate 37$a$ which is the synchronizing signal to which all of the engines are to be synchronized (i.e., in this case, the pulse train from engine 2).

In the present embodiment, and according to FIGS. 1 and 2, the synchronization enable signals initiated from switches 20, 21, 22 and 23 from cockpit 10 are shown passing through electrical switches 41$a$, 41$b$, 41$c$ and 41d of flight computer 16 before being applied to gates 37a, 37b, 37c and 37d. Thus, as soon as the speed of each propeller is within a selected percentage of the speed of the propeller of the master engine as selected by the student pilot, and if the student pilot has enabled the synchronization circuitry, the propeller speed will be synchronized since electrical switches 41a, 41b, 41c and 41d will be closed. If this system is used in a complex simulator such as that shown, then the flight computer, acting upon such information as throttle settings and the like, will have computed when the speed of each of the four propellers is within a predetermined limit with respect to the propeller of the master engine and closed the appropriate switch 41. However, it will be appreciated that it is not necessary to use a flight computer with the present invention. For example, instead of a flight computer determining when the several propellers achieve a speed within the predetermined limits, the instructor could enable the synchronization from an instructor console located outside the cockpit by simply closing manual switches. In any event, whichever technique is used, as each of the several engines obtains a speed which approaches that of the engine selected as the master, the enable signal would be applied to the respective gates 37a, 37b, 37c and 37d such that synchronization can take place. It should be noted at this point that in the present example, this enable signal will also be applied to all of the gates designated as 37 including gate 37b which is, of course, the gate associated with the engine selected as master. Now, assuming the propeller of engine 1 is to be synchronized with the propeller 2, upon receiving the enable signal on line 42a, gate 37a will start providing to engine 1 speed control circuitry the signal representative of engine 2 speed which is received at terminal 40a of gate 37a rather than its own (engine 1) speed signal from input 36a. Thus, it can be seen that after all four synchronization signals have been sent to the respective gates 37a, 37b, 37c and 37d, each engine will now be attempting to synchronize its propeller speed to the same signal input. The output of phase detector 35a, as was mentioned heretofore, is then typically passed through suitable signal conditioning circuitry 39a. Although such signal conditioning may not be necessary, in the present embodiment, signal conditioning circuitry 39a provides damping of oscillations and signal amplification of the phase detector error signal prior to its application to summing amplifier 29a. Such damping would correspond to the natural damping which occurs as a result of the propeller inertia and serves to slow down the rapid synchronization which is characteristic of electronic servo systems. Real aircraft synchronization typically requires several seconds.

Thus, in summary of the foregoing, it can be seen that for any engine the output of the engine simulator circuitry 33a, 33b, 33c or 33d is controlled by a signal representative of throttle setting and the phase error signal on lines 31a through 31d algebraically combined by summing amplifiers 29a through 29d. The output of summing amplifiers 29a through 29d is then altered by degrading circuits 32a through 32d to prevent the pilot from achieving substantial synchronization by simply aligning the four throttles. The phase error signal combined with the throttle setting input for regulating the output frequency of the output pulses produced by engine simulators 33a through 33d is primarily representative of the difference between the speed of the engine being synchronized and the speed of the engine chosen as master. However, the signal representing the speed of the engine chosen as master is actually a combination of the output pulse train of the selected engine simulator plus a random error signal, to be discussed below.

Now, recalling that engine 2 was selected to be the master engine to which all the other propellers were to be synchronized, refer to the output of Schmitt trigger circuit 26b. It will be noted that in addition to be applied to phase detector 35b, the square wave pulse train from Schmitt trigger 26b representative of engine 2 propeller speed was also applied to selection gate 27. Thus, since engine 2 was selected, the input at 43b will be passed through selection gate 27 and applied to one of the two inputs of OR gate 44. The output of OR gate 44 is applied at input 40a, 40b, 40c and 40d of each of the gates 37a, 37b, 37c and 37d, respectively. The second input of OR gate 44 is a random pulse supplied by circuitry 45. This random pulse has the effect of slowly varying the signal to which all the engines are to be synchronized and thus more realistically simulates the slow variation that the selected master engine would have (in this case, engine 2).

Although any type of pulse insertion at OR gate 44 would in some respects simulate the seeking or hunting typically heard in an aircraft, it has been discovered that to be really effective and realistic, the inserted pulse must be substantially random. In the present invention, it has been found that the pseudo-random noise generator 45 discussed below provides excellent results.

Noise generator 45 provides a pulse output on line 46. The frequency of these pulses continuously varies, but is always considerably less than the pulse output of selection gate 27. As an example, for multi-engine turboprop aircraft operating at typical propeller speeds, the selected master engine output from selection gate 27 would vary between from about 45 pps to about 70 pps whereas the output of noise generator 45 will vary between from about 0.05 pps to about 0.2 pps. According to the present embodiment, square wave generator 48 included in noise generator 45 produces output pulses on output line 46 at a rate, within the above-mentioned limits, depending upon the input signal level at input terminal 47. Therefore, if a sawtooth signal is provided at input terminal 47, of pulse generator 48, it can be seen that the frequency of pulses on output line 46 will continuously vary. For example, as shown in FIG. 5a, the frequency output of pulses varies according to the level magnitude of the input ramp signal shown in FIG. 5b. A suitable function generator for this embodiment is the NE566 manufactured by Signetics Corp., Sunnyvale, California. Although a varying pulse rate which depends upon the input level of a regular sawtooth wave as produced by sawtooth wave generator 49 has been found to substantially produce the desired results, it has been discovered that the resulting droning effect is so regular and periodic that there is a loss of realism due to such periodic changes. Therefore, also according to the present embodiment, sawtooth wave generator 49 is responsive to inputs 50 and 51 for varying both the amplitude and frequency of the sawtooth wave used as an input to pulse generator 48. Thus, as shown in FIG. 2, a varying signal applied to the rate input 50 of sawtooth generator 49 will vary the rate at which the sawtooth output is produced. In addition, a varying signal applied to the level control input 51 of sawtooth generator 49 will determine the peak level that will be produced by the generator. For example, using FIGS. 5a and 5b as a reference, the effect on the output pulse at connecting line 46 by changing the rate and magnitude of the ramp signal generated by sawtooth generator 49 will be illustrated. FIGS. 6a and 6b show the ramp signal and resulting pulse outputs when the ramp peak level is doubled. FIGS. 7a and 7b show the ramp signal and resulting pulse outputs when the rate of the ramp signal is reduced to one half. Finally, FIGS. 8a and 8b show the ramp signal and resulting pulse outputs when the ramp peak level is doubled and the repetition rate of the ramp signal is cut in half. Thus, it can be seen that by varying both the repetition rate and the peak level of the ramp signal generator, the pulses provided by pulse generator 48 result in a repetition rate which is within a predetermined bandwidth, but which is substantially random within that band-width.

Therefore, it can be seen that the output of signal generators 33a, 33b, 33c and 33d is continuously varied as they attempt to "lock up" on the selected master signal from OR gate 44 which itself is continuously varied by the substantial random perturbation pulse inserted by noise generator 45. The four outputs of the four signal generators 33a, 33b, 33c and 33d are provided to the sound system 52 where they may be conditioned as necessary for use as modulating signals for four separate propeller noise generators. For example, as shown in FIG. 9, the pulse signal could be converted into a varying DC signal level by a filter circuit. This DC level could then be used for controlling the frequency on the propeller noise generator.

While there have been described what are at present considered to be preferred embodiments of this invention, it will be obvious to those skilled in the art that various changes or modifications may be made therein without departing from the invention, and it is, therefore, intended to cover all such changes and modifications as fall within the true spirit and scope of the invention.

I claim:

1. An acoustic system for simulating sounds characteristic of the propellers of a multi-engine aircraft wherein the propeller sounds are modulated to produce the undulating droning sounds generated by the propellers as their speed is regulated during the continuous task of synchronizing the speed of all the propellers with a reference signal comprising:
   a plurality of simulated aircraft controls, each for providing a control signal representative of the setting of one of said aircraft controls;
   first combining means for combining one of said control signals with a phase error signal to produce an engine control signal;
   a plurality of signal generators connected to receive said engine control signal, and for producing a plurality of output signals, each output signal having a characteristic which varies according to changes in said engine control signal;
   selection means for receiving at least two of said output signals and for selecting one of said received output signals as a reference output signal;
   generating means for providing a pulse signal at substantially random intervals;
   second combining means for combining said reference output signal and said pulse signal to produce a synchronizing signal;
   phase detection means for comparing one of said output signals to said synchronizing signal to produce said phase error signal; and
   a sound generator responsive to said output signals for producing sounds characteristic of the propellers of a multi-engine aircraft, said produced sounds varying in response to variations of said characteristic of said output signal to produce the undulated droning sound characteristic of the propellers of a multi-engine aircraft.

2. The apparatus of claim 1 wherein at least one of said simulated aircraft controls is an aircraft throttle, and wherein the engine control signal provided by said first combining means varies in response to changes in said phase error signal and the control signal provided by said simulated aircraft throttle.

3. The apparatus of claim 1 and further comprising a trainee station having instruments and containing said simulated aircraft controls for providing a representation of the cockpit of an aircraft being simulated, said simulated aircraft controls including throttle means for providing one of said control signals which is representative of a variable throttle setting to said first combining means, and wherein said engine control signal provided by said first combining means varies in response to changes in said throttle setting and said phase error signal.

4. The apparatus of claim 1 wherein said reference output signal comprises a pulse train and said generating means provides said pulse signal at a rate determined by the magnitude of a variable input signal.

5. The apparatus of claim 4 wherein said generating means further comprises a sawtooth generator for generating said variable input signal.

6. The apparatus of claim 1 and further including enabling means for enabling said phase detector means to compare one of said output signals to said synchronization signal.

7. A method for simulating the undulating droning sounds generated by the propellers of a multi-engine aircraft as the propeller speed is regulated during the continuous task of synchronizing the speed of all of the propellers with a reference signal, comprising the steps of:
   generating a plurality of output signals, each of said output signals having a characteristic which is responsive to variations of an engine control signal;
   selecting one of said output signals as a reference output signal;
   providing a pulse signal at substantially random intervals;
   combining said reference output signal and said pulse signal to produce a synchronization signal;
   generating a phase error signal representative of the phase difference between one of said output signals and said synchronization signal;
   combining a signal representative of the setting of an aircraft control and said phase error signal to produce said engine control signal; and
   generating sounds characteristic of the propellers of a multi-engine aircraft, which sounds vary in accordance with variations of said characteristic of said output signal to produce the undulating droning sound characteristic of said propellers being synchronized.

8. The method of claim 7 wherein said aircraft control is an aircraft throttle, and further comprising the step of varying said engine control signal in accordance with changes in said throttle setting.

\* \* \* \* \*